(12) United States Patent
Yamamoto et al.

(10) Patent No.: US 8,077,299 B2
(45) Date of Patent: Dec. 13, 2011

(54) METHOD FOR MEASURING POLARIZATION CHARACTERISTICS OF OPTICAL FIBER, DRAWING METHOD, METHOD FOR IDENTIFYING ABNORMAL POINT, AND METHOD FOR CONFIGURING OPTICAL FIBER TRANSMISSION LINE

(75) Inventors: Yoshinori Yamamoto, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 64 days.

(21) Appl. No.: 12/530,088

(22) PCT Filed: Feb. 12, 2008

(86) PCT No.: PCT/JP2008/052256
§ 371 (c)(1),
(2), (4) Date: Sep. 4, 2009

(87) PCT Pub. No.: WO2008/108140
PCT Pub. Date: Sep. 12, 2008

(65) Prior Publication Data
US 2010/0128257 A1    May 27, 2010

(30) Foreign Application Priority Data
Mar. 6, 2007   (JP) .................. P2007-055738

(51) Int. Cl.
*G01N 21/00*   (2006.01)
(52) U.S. Cl. .................................. 356/73.1
(58) Field of Classification Search .......... None
See application file for complete search history.

(56) References Cited

U.S. PATENT DOCUMENTS

| | | |
|---|---|---|
| 4,997,277 A | 3/1991 | Horiguchi et al. |
| RE34,972 E | 6/1995 | Horiguchi et al. |
| 6,724,469 B2 | 4/2004 | Leblanc |
| 2008/0068586 A1* | 3/2008 | Kishida et al. ............ 356/32 |

FOREIGN PATENT DOCUMENTS

| | | |
|---|---|---|
| JP | 2-006725 | 1/1990 |
| JP | 5-284110 | 10/1993 |
| JP | 10-160625 | 6/1998 |
| JP | 2000-180265 | 6/2000 |

(Continued)

OTHER PUBLICATIONS

Torsten Gogolla et al., "Distributed Beat Length Measurement in Single-Mode Optical Fibers Using Stimulated Brillouin-Scattering and Frequency-Domain Analysis," Journal of Lightware Technology, vol. 18, No. 3, Mar. 2000, pp. 320-328.

(Continued)

*Primary Examiner* — Tu Nguyen
(74) *Attorney, Agent, or Firm* — McDermott Will & Emery LLP

(57) ABSTRACT

The present invention relates to a measuring method, etc., comprising a structure for accurately measuring optical characteristics such as PMD of an optical fiber. The measuring method is a technique for measuring polarization characteristic distributions along the longitudinal direction of the optical fiber as a measuring object by using BOCDA, and by propagating probe light and pumping light opposite in the optical fiber, BGS is generated at a plurality of respective measurement positions. Then, based on Brillouin gain fluctuations at the respective measurement positions, polarization characteristic distributions are calculated.

8 Claims, 11 Drawing Sheets

FOREIGN PATENT DOCUMENTS

| | | |
|---|---|---|
| JP | 3667132 | 7/2005 |
| JP | 2007-155409 | 6/2007 |

OTHER PUBLICATIONS

William H. Press et al., "Numerical Recipes in C: The Art of Scientific Computing, Second Edition," Cambridge University Press, Chapter 12, 1992.

Yoshinori Yamamoto, "Distributed Birefringence Measurement in Optical Fibers Using Stimulated Brillouin Scattering," Proceedings of the IEICE Conference, 2007 Tsushin 2, Mar. 2007, p. 530, with English Translation.

Chinese Office Action, with English translation, issued in Chinese Patent Application No. 200880007343.3, mailed Aug. 25, 2010.

Hu, X-D, et al., "A Distributed Optical Fiber Single-end Sensing Technique Based on Brillouin Gain", Journal of Optoelectronics Laser, pp. 86-88, vol. 11 No. 1.

English translation of the International Preliminary Report on Patentability issued in application No. PCT/JP2008/052256 dated Oct. 8, 2009.

Japanese Office Action, with English translation, issued in Japanese Patent Application No. 2007055738, dated Oct. 11, 2011.

* cited by examiner (a)

(b)

(c)

(d)

(a)

(b)

(c)

(a)

(b)

(c)

METHOD FOR MEASURING POLARIZATION CHARACTERISTICS OF OPTICAL FIBER, DRAWING METHOD, METHOD FOR IDENTIFYING ABNORMAL POINT, AND METHOD FOR CONFIGURING OPTICAL FIBER TRANSMISSION LINE

RELATED APPLICATIONS

This application is the U.S. National Phase under 35 U.S.C. §371 of International Application No. PCT/JP2008/052256, filed on Feb. 12, 2008, which in turn claims the benefit of Japanese Application No. 2007-055738, filed on Mar. 6, 2007, the disclosures of which Applications are incorporated by reference herein.

TECHNICAL FIELD

The present invention relates to an optical fiber polarization characteristics measuring method, and relates to an optical fiber drawing method, an abnormal point identifying method, and an optical fiber transmission line establishing method using the polarization characteristics measuring method.

BACKGROUND ART

Conventionally, as a factor for limiting increases in speed and distance of an optical fiber communication system, polarization mode dispersion (PMD) is known.

PMD is a phenomenon in which birefringence of an optical fiber causes a differencial group delay between two orthogonal polarization modes propagating inside the optical fiber. Birefringence is a phenomenon in which a noncircular core of an optical fiber or an anisotropic stress such as an external pressure applied to the optical fiber lifts degeneracy between the two orthogonal polarization mode components propagating inside the optical fiber, and a difference is generated between the refractive indexes of the respective modes. Birefringence (B) as a parameter indicating the level of birefringence is expressed as the following expression (1).

$$B = |nx - ny| \quad (1)$$

Herein, nx and ny denote effective indexes of orthogonal polarization modes respectively.

When an optical fiber has uniform birefringence in a certain section, propagating light propagates while changing its polarization state periodically. This period is called beat length ($L_B$), and has a relationship with birefringence (B) expressed as the following expression (2).

$$L_B = \lambda/B \quad (2)$$

Herein, $\lambda$ denotes a light wavelength.

A noncircular core in the above-described optical fiber and a stress on an optical fiber are not uniform in the longitudinal direction, so that a technique for measuring polarization characteristic distributions of birefringence and beat length, etc., in the longitudinal direction of an optical fiber has been demanded.

To satisfy this demand, as a technique for measuring polarization characteristic distributions along the longitudinal direction of the optical fiber, Patent Document 1 discloses a POTDR (Polarization Optical Time Domain Reflectometer). However, the distance resolution in the POTDR is generally in a meter order, and this is not suitable for measuring a short beat length and fiber characteristic changes in a short section.

Patent Document 2 discloses a beat length measuring technique using Brillouin scattering. The technique disclosed in Patent Document 2 adopts BOFDA (Brillouin Optical Frequency Domain Analysis) as a method of measuring a Brillouin gain, and its distance resolution is 1.22 meters and 5.5 meters. However, even by using the BOFDA, it is difficult to measure optical fiber characteristics such as oscillation of Brillouin gain, that is, beat length relating to PMD with a higher distance resolution.

On the other hand, Patent Document 3 discloses Brillouin Optical Correlation Domain Analysis (BOCDA) as a Brillouin gain measuring method using Brillouin scattering.

Brillouin scattering is a phenomenon in which, when light (pumping light) propagates inside an optical fiber, the pumping light generates an acoustic wave in the optical fiber, and due to interaction of the pumping light and the acoustic wave, a part of the pumping light is scattered to the rear side. In this case, the frequency of the scattered light is shifted to the lower-frequency side. When light (probe light) which propagates opposite to pumping light is propagated, scattered light generated inside the optical fiber becomes a gain to amplify the probe light. In a silica glass optical fiber, the gain becomes maximum when the frequency difference between the pumping light and the probe light is about 10 GHz, and the gain given to the probe light at this time is called Brillouin gain.

The Brillouin gain is also changed by a relative polarization state of the pumping light and the probe light. For example, at a certain position inside an optical fiber, when polarizations of the pumping light and the probe light coincide with each other, the Brillouin gain becomes maximum, and when the polarizations are orthogonal, the Brillouin gain becomes zero.

When an optical fiber has uniform birefringence in a certain section, the pumping light and the probe light propagate opposite to each other while changing their polarization states periodically by setting the beat length ($L_B$) as one period. From this fact, the Brillouin gain also fluctuates periodically along the longitudinal direction of the optical fiber, and its fluctuation periods ($L_P$) are expressed as the following expression (3) (see FIG. 1).

$$L_P = L_B/2 \quad (3)$$

FIG. 1 is a view for describing the principle of beat length measurement using Brillouin scattering. In FIG. 1, the area (a) shows measurement positions P1 to P4 of an optical fiber 7 as a measuring object. The area (b) shows pumping light polarization states at the respective measurement positions P1 to P4 of the optical fiber 7 shown in the area (a). The area (c) shows probe light polarization states at the respective measurement positions P1 to P4 of the optical fiber 7 shown in the area (a). The area (d) shows a Brillouin gain along the longitudinal direction of the optical fiber 7 and periods thereof (Brillouin periods).

Patent Document 1: U.S. Pat. No. 6,724,469
Patent Document 2: T. Gogolla et al., "Distributed Beat Length Measurement in Single-Mode Optical Fibers Using Stimulated Brillouin-Scattering and Frequency-Domain Analysis," Journal of Lightwave Tech., Vol. 18, No. 3, pp. 320-328 (March 2000)
Patent Document 3: Japanese Patent No. 3667132
Non-patent Document 1: Press, et al., "Numerical Recipes in C, Second Edition," Chapter 12, Cambridge University Press.

DISCLOSURE OF THE INVENTION

Problems that the Invention is to Solve

The present inventors have examined the above prior art, and as a result, have discovered the following problems. That is, in the conventional POTDR and BOFDA, the distance resolution is low, so that optical fiber characteristics (polarization characteristics) relating to PMD such as a short beat length and birefringence could not be measured accurately.

The present invention has been developed to eliminate the problems described above. It is an object of the present invention to provide a measuring method comprising a structure for accurately measuring characteristic distributions of an optical fiber relating to PMD. In addition, as an applied technique based on such a method of measuring optical fiber characteristics relating to the PMD, the present invention aims at provision of an optical fiber drawing method, an abnormal point identifying method for an optical fiber, and an optical fiber transmission line establishing method.

Means for Solving the Problems

The present invention was completed by the inventors by finding that the BOCDA was very useful for measurement of optical fiber characteristics relating to PMD. In other words, by using the BOCDA, Brillouin gain distributions along the longitudinal direction of an optical fiber can be measured with high distance resolution (centimeter-order). The BOCDA makes it possible to measure distributions of the beat length and birefringence based on longitudinal fluctuation periods of the Brillouin gain at respective measurement positions or in respective sections of the optical fiber.

An optical fiber polarization characteristics measuring method according to the present invention, which is for measuring polarization characteristic distributions along the longitudinal direction of an optical fiber as an object to be measured by using BOCDA, comprises a light incidence step, a Brillouin gain spectrum (BGS) measuring step, and a calculating step for calculating polarization characteristic distributions. In the light incidence step, probe light is made incident from one end of the optical fiber as a measuring object, and pumping light is made incident from the other end of the optical fiber (opposite incidence of pumping light and probe light on the optical fiber). In the measuring step, as a gain given to the probe light due to Brillouin scattering caused by propagation of the pumping light inside the optical fiber, BGS at respective measurement positions along the longitudinal direction of the optical fiber are measured. In the calculating step, based on Brillouin gain fluctuations at the respective measurement positions, polarization characteristic distributions along the longitudinal direction of the optical fiber are calculated.

In the present invention, by applying BOCDA (Brillouin Optical Correlation Domain Analysis), Brillouin gain measurement inside an optical fiber with a high distance resolution of 10 centimeters or less becomes possible, and based on measured values, optical fiber characteristics relating to the PMD can be measured or calculated.

Other optical fiber characteristics relating to PMD are a coupling length of polarization coupling in an optical fiber and swing periods in an optical fiber that was swing-drawn, etc. These optical fiber characteristics can also be measured according to Brillouin gain changes along the longitudinal direction of the optical fiber. Particularly, the swing periods which have an effect of reducing PMD are shorter than the beat length, so that the measuring technique with high distance resolution (BOCDA) like the present invention is suitable.

The principle of measurement according to the BOCDA is shown in FIG. 2. In the BOCDA, continuous light (pumping light) frequency-modulated at a predetermined modulation frequency and continuous light (probe light) having a central frequency lower than that of pumping light and frequency-modulated at a predetermined modulation frequency are made incident opposite from both ends of the optical fiber 7. At this time, the pumping light and probe light respectively propagate opposite inside the optical fiber 7. In this case, the incident polarization state of at least one of the pumping light and probe light may be controlled by a polarization controller. In this case, oscillation of a Brillouin gain in a measuring object section can be more precisely observed.

The inside of the optical fiber 7 periodically has positions at which correlation of the pumping light and the probe light increases (correlation peak position). At the correlation peak position (position "a"), the frequencies of the pumping light and the probe light oscillate synchronously, and a frequency difference between these is always constant. Therefore, the probe light is given with the fiber's original Brillouin gain (see the graph Fa in FIG. 2). On the other hand, at a position with a smaller correlation (position b), the frequency difference between the pumping light and probe light continuously fluctuates (frequency difference fluctuations), so that the probe light is hardly given with the Brillouin gain (see the graph Fb in FIG. 2).

By using this principle, only one correlation peak at which the optical path difference between the pumping light and the probe light is not zero can be generated in a predetermined section of a measuring object. By observing the probe light which was given with the Brillouin gain in this section, Brillouin gain measurement at the correlation peak position can be performed. By changing the modulation frequency or phase difference in the frequency modulation to be applied to the pumping light and probe light, the correlation peak position, that is, the Brillouin gain measurement position can be changed. By performing the Brillouin gain measurement while changing the measurement position set along the longitudinal direction of the optical fiber, changes in Brillouin gain (oscillation of Brillouin gain) along the longitudinal direction of the optical fiber can be measured.

In the optical polarization characteristics measuring method according to the present invention, the distance resolution is excellent in comparison with conventional measuring techniques, so that the measurement positions can be set more accurately than in the conventional measuring techniques. When the modulation frequency in frequency modulation to be applied to the pumping light and probe light is defined as fm, and the modulation amplitude is defined as $\Delta f$, the distance resolution $\Delta z$ of the BOCDA is expressed as the following expression (4).

$$\Delta z = \frac{v_g \cdot \Delta v_B}{2\pi \cdot f_m \cdot \Delta f} \tag{4}$$

Herein, $v_g$ and $\Delta v_B$ denote a group velocity of light in the optical fiber and a Brillouin spectral line width, respectively. For example, when fm=20.1 MHz, $\Delta f$=2.74 GHz, and $\Delta v_B$=25.5 MHz, the distance resolution $\Delta z$ is about 1.5 centimeters, so that the present invention has a centimeter-order distance resolution.

The Brillouin gain depends on the frequency difference $\nu$ between the pumping light and the probe light, and has a spectrum expressed as the following expression (5).

$$g_B(v) = \frac{g_0}{1 + \{2(v - v_B)/\Delta_{v_B}\}^2} \quad (5)$$

Herein, $g_0$, $v_B$, and $\Delta v_B$ denote a maximum gain, a Brillouin frequency shift, and a Brillouin spectral line width, respectively.

When the frequency difference between the pumping light and the probe light is set to $v_B$, the Brillouin gain to be measured becomes maximum. Therefore, changes in Brillouin gain at the respective measurement positions can be easily measured. In a silica glass optical fiber, $v_B$ is about 9 to 12 GHz. $v_B$ has the acoustic velocity in the optical fiber as a parameter, so that it fluctuates according to strain and a temperature applied to the optical fiber. Therefore, by sweeping the frequency difference near an expected $v_B$, the maximum Brillouin gain can also be measured.

An incident polarization state of at least one of the pumping light and the probe light may be controlled so that a measurement reference point at which the Brillouin gain becomes maximum is present in the optical fiber as a measuring object. In this case, the relative polarization state of the pumping light and the probe light is controlled. Alternatively, a polarization state of at least one of the pumping light and the probe light may be controlled so that a measurement reference point at which the amplitude of the Brillouin gain oscillation becomes maximum is present. Setting of such a measurement reference point as a measurement position makes it easy to grasp the condition of Brillouin gain fluctuations along the longitudinal direction of the optical fiber.

For example, by controlling a polarization controller, an incident polarization state of at least one of the probe light and the pumping light can be controlled.

Herein, the incident polarization state is determined according to an incidence angle with respect to the orthogonal polarization mode of the optical fiber (controlled by a polarizer of the polarization controller 8 shown in FIG. 4) and a phase difference between orthogonal polarization mode components (controlled by a wave plate of the polarization controller 8). Stokes parameter distributions of the pumping light and the probe light along the longitudinal direction of the optical fiber are obtained through measurement and analysis by using a plurality of polarization states (for example, linear polarizations with incidence angle differences of 0 degrees, 45 degrees, and 90 degrees respectively or circular polarizations) as the incident polarization state of the pumping light and the probe light.

In the optical fiber polarization characteristics measuring method according to the present invention, the Brillouin gain fluctuation periods can be calculated by Fourier-transforming the Brillouin gain fluctuations. In other words, the Brillouin gain fluctuation periods ($L_P$) can be calculated from the Brillouin gain fluctuations, and the Fourier-transformation is normally executed on a personal computer by means of fast Fourier transformation (FFT). FFT is generally known as disclosed in Non-patent Document 1. Briefly describing the procedures of FFT with reference to FIG. 3, (1) first, as shown in the area (a) of FIG. 3, continuous N data are extracted from the respective predetermined sections including the measurement positions in the optical fiber as the measuring object. (2) Next, a spectrum waveform as shown in the area (b) of FIG. 3 can be obtained through fast Fourier transformation by using N data. In the area (b) of FIG. 3, only the FFT calculation result of section 1 shown in the area (a) of FIG. 3 is shown. (3) A frequency (1/m) at which the spectrum waveform peaks corresponds to $1/L_P$ in this section. (4) Then, by repeating the above-described steps (1) to (3) while shifting little by little the section for extracting the data, as shown in the area (c) of FIG. 3, distributions of the Brillouin gain fluctuation periods $L_P$ (or $1/L_P$) at the respective measurement positions along the longitudinal direction of the optical fiber are obtained. The polarization characteristics can be obtained from the $L_P$ as described above. At this time, various correspondences between the $L_P$ and the measurement positions are possible, and for example, the N/2-th measurement position of N data may correspond to $L_P$.

As a method of obtaining $L_P$ at respective measurement positions other than the above-described measurement positions, for example, there is available a method in which respective $L_P$ are measured by setting one period as one section, a method in which an average value of $L_P$ in a predetermined section around the measurement position is measured, and so on.

In the optical fiber polarization characteristics measuring method according to the present invention, the measurement of the Brillouin fluctuation periods may be repeated while changing the measurement position. In other words, the Brillouin gain fluctuation periods are measured based on Brillouin gain fluctuations at a plurality of measurement positions respectively set at predetermined intervals along the longitudinal direction of the fiber (including calculation based on the Brillouin gain fluctuations). As a result of this measurement, when the Brillouin gain fluctuation periods measured at a plurality of measurement positions set in advance are out of a permissible range (for example, not more than half of an entire length average of the Brillouin gain fluctuation periods), remeasurement is performed (including calculation based on the Brillouin gain fluctuations). The remeasurement of the Brillouin gain fluctuation periods is performed by narrowing the intervals of the plurality of measurement positions. This is for more accurately identifying the position at which the Brillouin gain is not the permissible range.

The Brillouin gain fluctuation periods are remeasured by adjusting the incident polarization states of the probe light and the pumping light to be made incident on the optical fiber so that, when the Brillouin gain fluctuation periods measured at the plurality of measurement positions set in advance is out of the permissible range, a measurement reference point is present at a portion at which the Brillouin gain fluctuation out of the permissible range is obtained. In this case, it is because the reference position can be easily recognized by maximizing the Brillouin gain and the Brillouin gain can be accurately measured. A point which is easily recognized may be set as a reference position. To control the incident polarization state of at least one of the probe light and the pumping light to be made incident on the optical fiber so that a measurement position at which the Brillouin gain becomes maximum is present, for example, the polarization state of at least one of the probe light and the pumping light may be controlled by the polarization controller.

It is considered that one of the effective usages of the optical fiber polarization characteristics measuring method according to the present invention is application to an optical fiber manufacturing process. In other words, an optical fiber drawing method according to the present invention is a swing drawing method in which an optical fiber is spun by periodically inclining a rotation axis of a swing roller which comes into contact with the optical fiber with respect to a reference axis when winding the optical fiber which is drawn while one end of an optical fiber preform is heated. The optical fiber drawing method comprises a sampling step, a measuring step, a parameter adjusting step, and a drawing/winding step. In the sampling step, a part of the optical fiber obtained by means of the above-described swing drawing is cut out as an optical fiber sample of a measuring object. In the measuring step, Brillouin gain fluctuation periods at respective measurement positions along the longitudinal direction of the cut-out optical fiber sample are measured by using the above-described measuring method (optical fiber polarization characteristics measuring method according to the present invention). In the parameter adjusting step, based on correlation between the measured Brillouin gain fluctuation periods and the swing periods of the swing roller, the swing periods of the swing roller are adjusted. In the drawing/winding step, the optical fiber which is drawn while periodically inclining the rotation axis of the swing roller with respect to the reference axis in the adjusted swing periods is wound by a winder.

The adjustment of the swing periods includes various adjustments such as adjustments of the spinning speed, reverse periods, and the way of reversing in reverse for a fiber in swing-drawing of the optical fiber, which are normally performed in this kind of field.

As one of the effective usages of the optical fiber polarization characteristics measuring method according to the present invention, application to an abnormal point identifying method in which a laid optical fiber is a measuring object is also possible. In other words, the abnormal point identifying method according to the present invention comprises a measuring step, a judging step, a remeasuring step, and an abnormal point identifying step. In the measuring step, Brillouin gain fluctuation periods in respective measurement sections which are along the longitudinal direction of a laid optical fiber as a measuring object and include a plurality of measurement positions set at predetermined intervals are measured by using the above-described measuring method (optical fiber polarization characteristics measuring method according to the present invention). In the judging step, first, Brillouin gain fluctuation periods measured in the respective measurement sections and a first permissible range set in advance are compared. As a result of this comparison, when the measured Brillouin gain fluctuation periods exceed the first permissible range, a measurement section in which the Brillouin gain fluctuation periods are measured is judged as an abnormal section. In the remeasuring step, the measurement section judged as an abnormal section is set as a remeasurement section and a plurality of measurement positions the intervals of which are narrowed are reset. Thereafter, Brillouin gain fluctuation periods in the remeasurement section are remeasured. Then, also at the abnormal point identifying step, the remeasured Brillouin gain fluctuation periods and a second permissible range set in advance are compared. Even in this comparison result, when the remeasured Brillouin gain fluctuation periods exceed the second permissible range, the remeasurement section in which the Brillouin gain fluctuation periods are measured is identified as an abnormal point. For example, the first permissible range is a criterion of remeasurement, and the second permissible range is a criterion for judging an abnormality. Accordingly, even in a laid optical fiber, an abnormal section can be quickly and accurately identified.

Further, as one of the effective usages of the optical fiber polarization characteristics measuring method according to the present invention, application to establishment and maintenance of an optical fiber transmission line by using the above-described abnormal point identifying method (abnormal point identifying method for an optical fiber according to the present invention) is possible. In other words, the optical fiber transmission line establishing method according to the present invention comprises an abnormal point removing step, a laying step, and a confirming step. At the abnormal point removing step, a part of an optical fiber corresponding to a section identified as an abnormal point by the above-described identifying method is removed. At the laying step, another optical fiber is laid in the regulated section as the removed part of the optical fiber. Then, at the confirming step, according to the above-described identifying method for a measuring object of the entire optical fiber transmission line including another optical fiber newly laid as a measuring object, identification of an abnormal point is performed again in the entire optical fiber transmission line. In this case, even from the laid optical fiber, an abnormal section can be removed, and by replacing the abnormal point with a new optical fiber, the quality of polarization characteristics in the entire optical fiber transmission line can be maintained.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

As described above, in accordance with the present invention, Brillouin gain distributions are measured along the longitudinal direction of an optical fiber by using BOCDA. Accordingly, Brillouin distribution measurement with a high distance resolution is possible, and a short beat length (or swing periods, coupling length) or changes in optical fiber characteristics in a short section can be observed. In other words, polarization characteristic distributions along the longitudinal direction of the optical fiber can be measured and calculated. In the measuring method to which BOCDA is applied, by controlling the relative polarization state of the pumping light and the probe light, Brillouin gain fluctuations along the longitudinal direction of the optical fiber are more clearly observed. In other words, polarization characteristic distributions along the longitudinal direction of the optical fiber can be more properly measured. Further, as an applied technique of the measuring technique, abnormal point detection and abnormal point removal are also possible at the optical fiber drawing (manufacturing) step and in a laid optical fiber, and many technical effects can be expected.

DESCRIPTION OF THE REFERENCE NUMERALS

Figure 1:
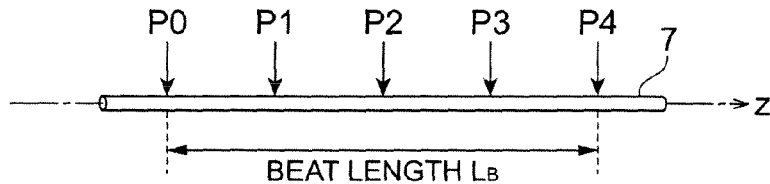
FIGS. 1(a), 1(b), 1(c) and 1(d) are views for describing the principle of beat length measurement using Brillouin scattering.
Figure 1:
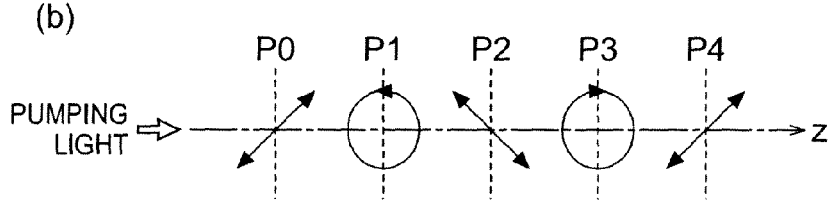
Figure 1:
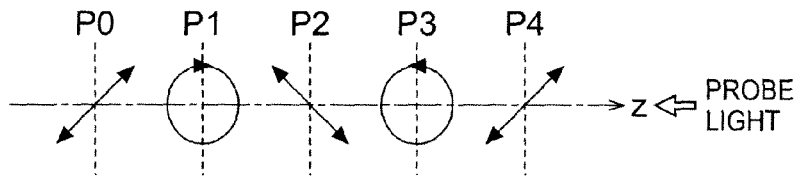
Figure 1:
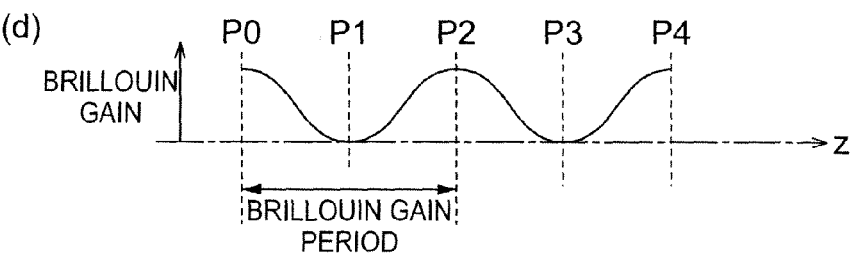
Figure 2:
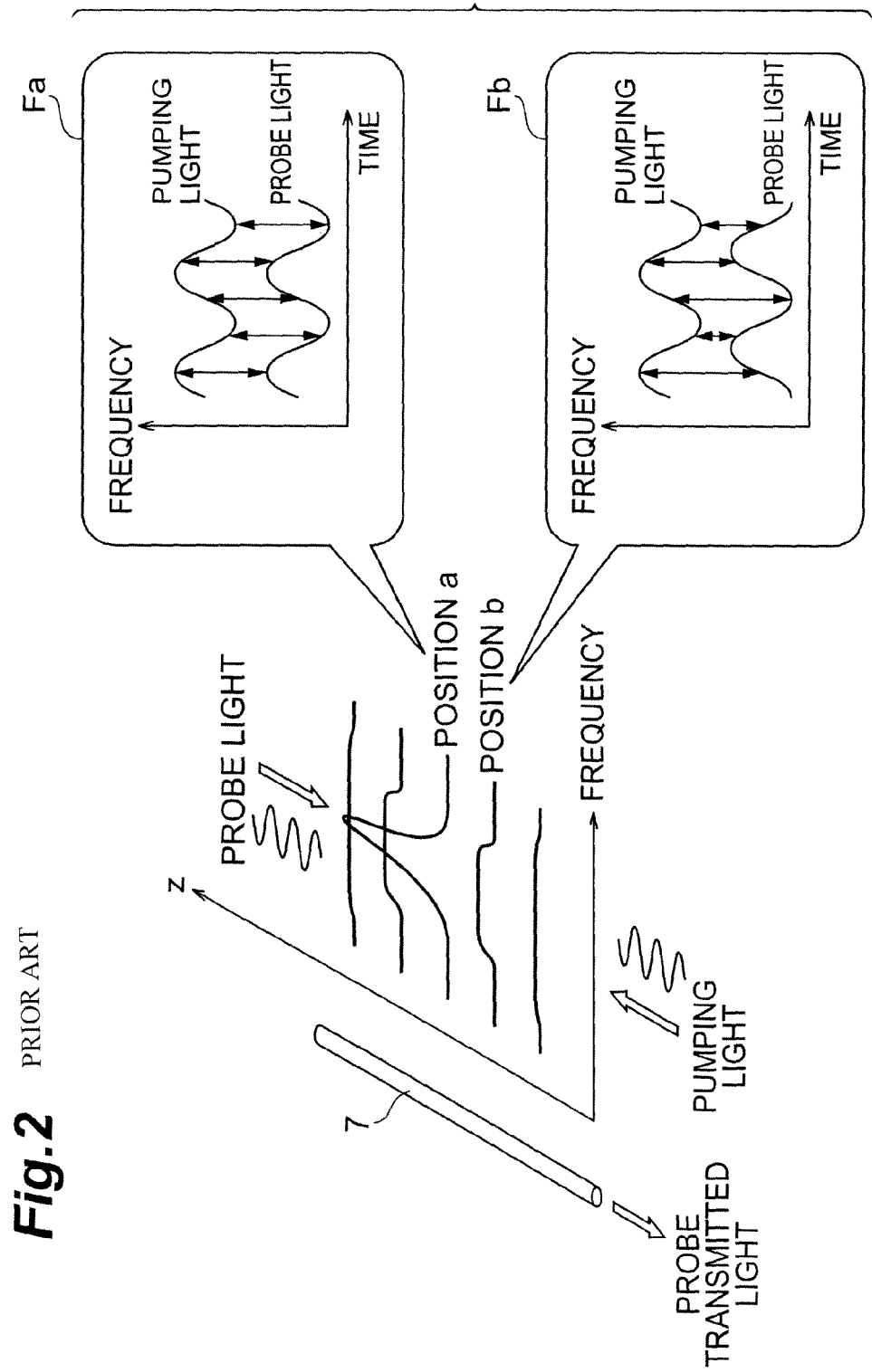
FIG. 2 is a view for describing the measurement principle of BOCDA.
Figure 3:
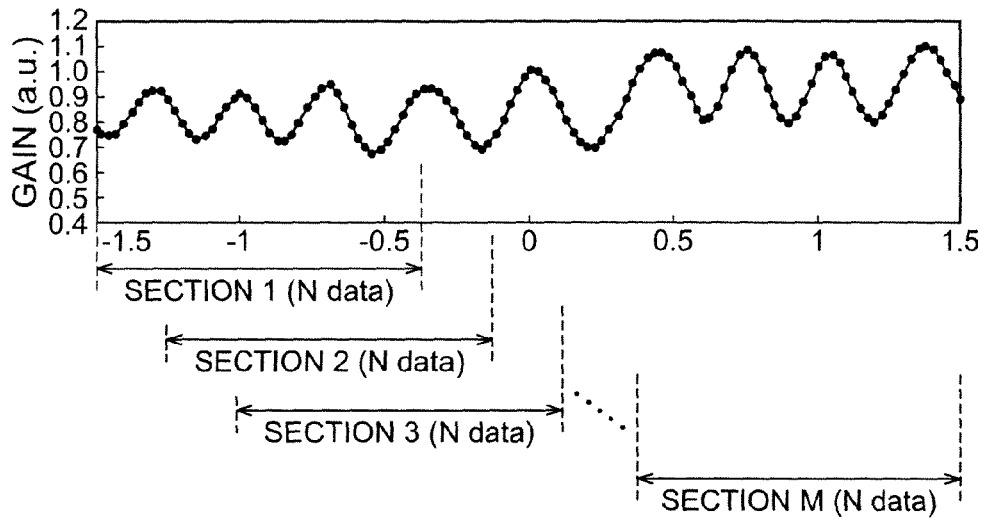
FIGS. 3(a), 3(b) and 3(c) are views for describing the principle of calculation of the gain fluctuation periods ($L_P$) based on Brillouin gain fluctuations.
Figure 3:
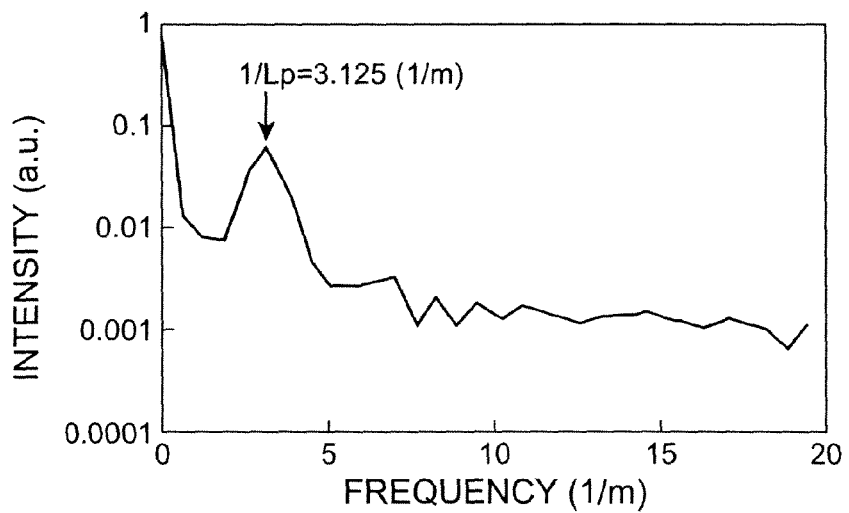
Figure 3:
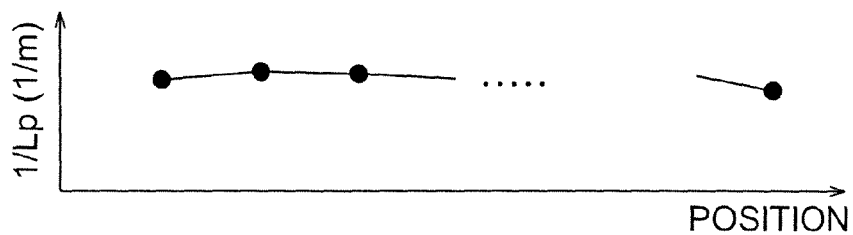

1 . . . waveform generator; 2 . . . laser diode (LD); 4 . . . phase modulator; 5, 8, 18 . . . polarization controller; 7 . . . optical fiber (measuring object); 17 . . . analyzer; 100 . . . abnormal point; and 118 . . . swing roller.

BEST MODES FOR CARRYING OUT THE INVENTION

In the following, embodiments of the present invention will be explained in detail with reference to FIGS. 1 to 11. In the description of the drawings, identical or corresponding components are designated by the same reference numerals, and overlapping description is omitted.

Figure 4:
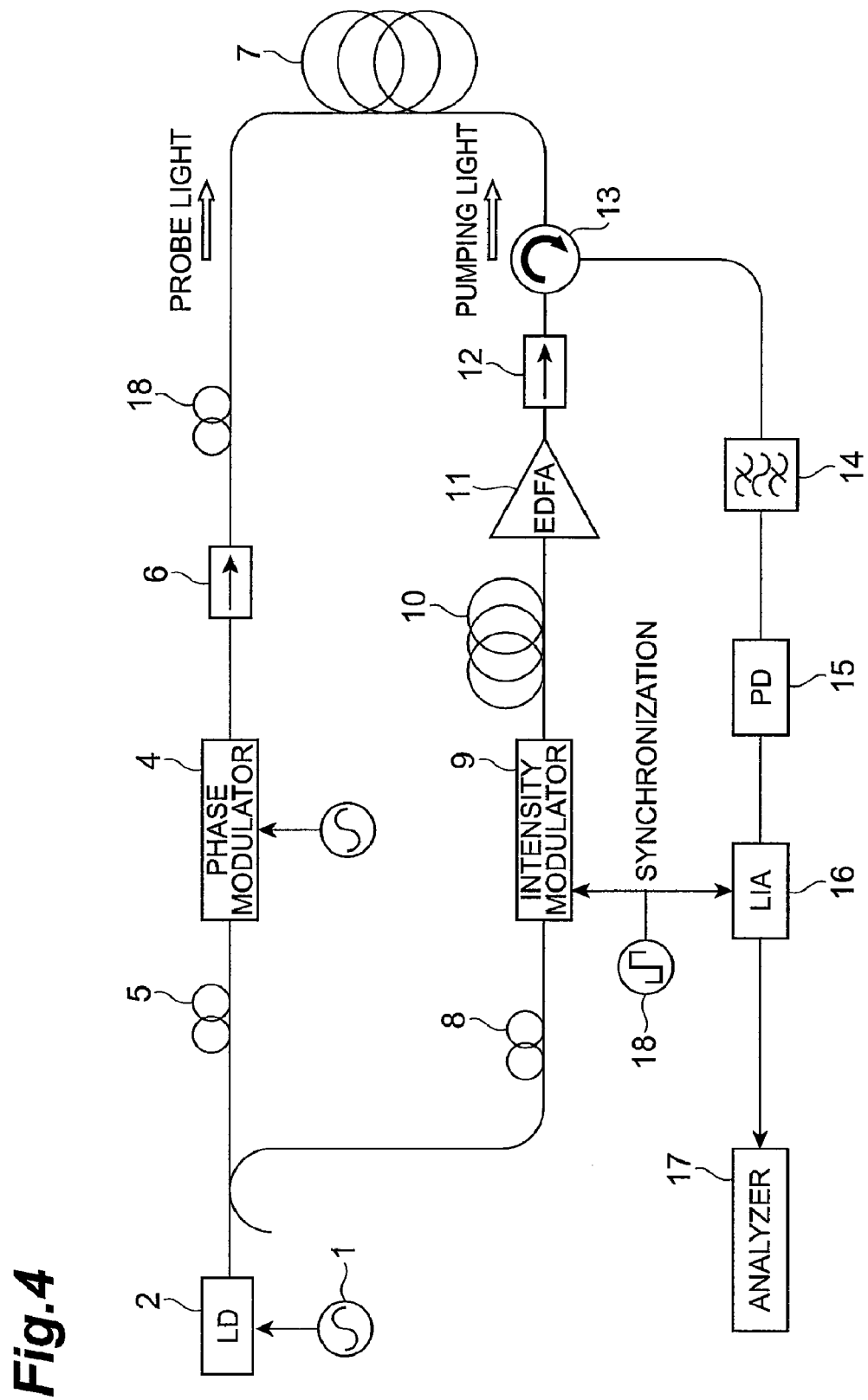
FIG. 4 is a view showing an example of an apparatus which performs the optical fiber polarization characteristics measuring method according to the present invention.

First, an example of a measuring apparatus for carrying out the optical fiber polarization characteristics measuring method according to the present invention is shown in FIG. 4. The measuring apparatus shown in FIG. 4 includes a light source, a probe light output system for outputting probe light to one end of an optical fiber 7 as a measuring object; a pumping light output system for outputting pumping light to the other end of the optical fiber 7 as a measuring object; and a measuring system. The light source includes a laser diode (LD) 2 and a waveform generator 1. By modulating a current applied to the LD 2 into a sine wave form by the waveform generator 1, continuous light which was frequency-modulated is output from the LD 2. Output light from the light source is branched by a 3 dB coupler 3.

The probe light output system includes a 3 dB coupler 3, a polarization controller 5, a phase modulator 4, an optical isolator 6, and a polarization controller 18. One branched light component (a part of the output light from LD 2) branched by the 3 dB coupler 3 passes through the polarization controller 5, and then reaches the phase modulator 4. In the phase modulator 4, the incident branched light component is phase-modulated by a micro wave of about 10 GHz to generate sidebands. The polarization controller 5 adjusts the polarization state of the branched light component from the 3 dB coupler 3 so that the sideband components are most effectively generated in the phase modulator 4. The low frequency side first sideband component passes through the optical isolator 6, and is then made incident on one end of the optical fiber 7 as probe light.

On the other hand, the pumping light output system includes a 3 dB coupler 3, a polarization controller 8, an intensity modulator 9, a fiber delay 10, an EDFA (Erbium-Doped Fiber Amplifier) 11, an optical isolator 12, and an optical circulator 13. The other branched light component (a part of the output light from the LD 2) branched by the 3 dB coupler 3 is used as pumping light. The branched light component passes through the polarization controller 8, and then reaches the intensity modulator 9. In the intensity modulator 9, a gate is opened and closed periodically, and the branched light component which has passed through the intensity modulator 9 passes through the fiber delay 10. The fiber delay 10 is an optical component provided for adjusting an optical path difference for generating a correlation peak at which the optical path difference between the pumping light and the probe light inside the optical fiber 7 is not zero. The branched light component which has passed through the fiber delay 10 is amplified by the optical fiber amplifier (EDFA) 11, and then made incident on the other end of the optical fiber 7 as pumping light via the optical isolator 12 and the optical circulator 13.

The relative polarization state of the pumping light and the probe light is performed by controlling the incident polarization state of the pumping light by the polarization controller 8. The modulation frequency of the frequency modulation for the light source is set so that a predetermined measurement position and the correlation peak position in the optical fiber 7 to be measured coincide with each other. At this time, mainly at the correlation peak position, the probe light obtains Brillouin gain from the pumping light mainly at the correlation peak position. The probe light which has obtained the Brillouin gain is output from the other end (incident end of the pumping light) of the optical fiber 7, and taken out by the optical circular 13.

In the measuring apparatus of FIG. 4, the measuring system includes an optical circulator 13, an optical filter 14, a photodiode (PD) 15, a lock-in amplifier 16, and an analyzer 17. The intensity modulator 9 and the lock-in amplifier (LIA) 16 of the pumping light output system are synchronized by a pulse signal output from the waveform generator 19.

After extra components are removed by the optical filter 14, the taken-out probe light is converted into an electric signal by the PD 15. In the LIA 16, synchronous detection synchronized with the intensity modulator 9 is performed, and Brillouin gain which the probe light obtained is measured. Then, when the correlation peak position is set at the next measurement position, the Brillouin gain is measured in the same manner By repeating this Brillouin gain measurement at the respective measurement positions, Brillouin gain distributions along the longitudinal direction of the optical fiber 7 as a measuring object are measured. The measurement results of the thus obtained Brillouin gain distributions are transmitted to the analyzer 17.

The analyzer 17 is a means a part or the whole of which is realized by hardware resources such as a computer and exclusive circuits, etc., and software resources such as computer programs, and is constructed so as to calculate and obtain polarization characteristic distributions as described later based on Brillouin gain measured values input from the LIA 16 and Brillouin gain fluctuations at the respective measurement positions.

The pumping light and the probe light may be generated by using different LDs. By modulating the oscillation frequency of one LD into a rectangular waveform, the pumping light and the probe light can also be generated alternately. The polarization controller 8 controls the polarization state of the pumping light in the optical fiber 7 by controlling the polarization state of the branched light component made incident as the pumping light. However, for controlling the relative polarization state of the pumping light and the probe light in the optical fiber 7, the polarization state of the probe light may be controlled by another polarization controller 18. In this case, for example, another polarization controller 18 is preferably installed between the optical isolator 6 positioned at a rear stage of the phase modulator 4 and the optical fiber 7 (see FIG. 4).

Figure 5:
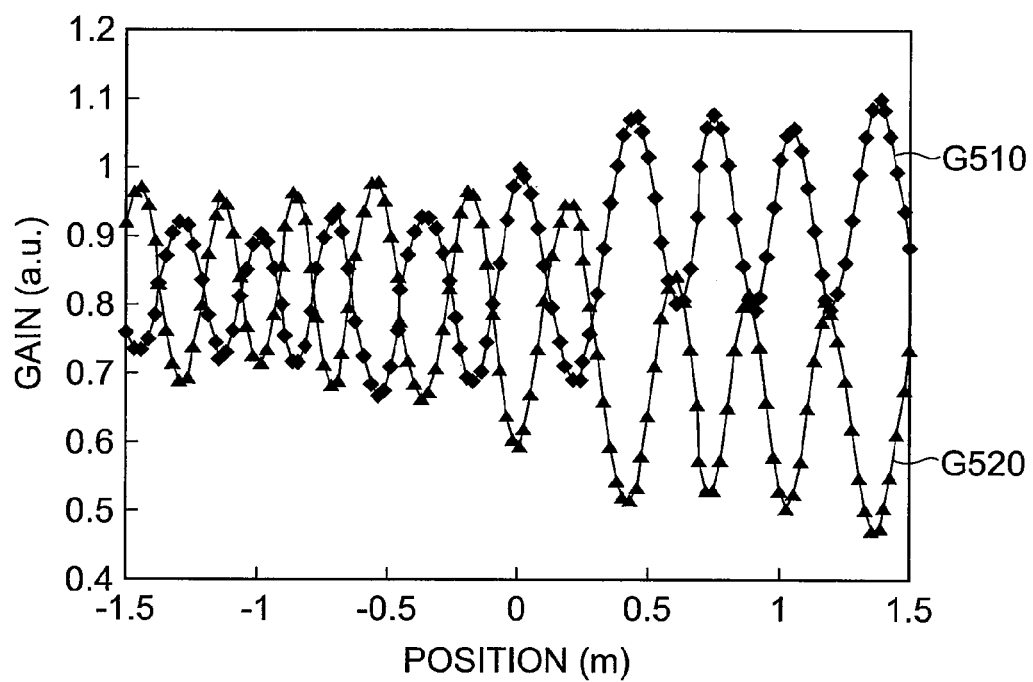
FIG. 5 is a graph showing an example of Brillouin gain measurement results using the apparatus shown in FIG. 4.

FIG. 5 shows an example of the Brillouin gain measurement results using the measuring apparatus of FIG. 4. The Brillouin gain measurement was performed in a state where a part of the optical fiber 7 as a measuring object is wound in a circular shape with a radius of 15 millimeters. In birefringence, birefringence induced by this winding is dominant, and polarization coupling does not occur.

The graph G510 (data of square points) and the graph G520 (data of triangular points) in FIG. 5, respectively, are results when the 0 meter position was set as a measurement reference point, and the incident polarization state of the pumping light was controlled by the polarization controller 8 so that the Brillouin gain at this measurement reference point became maximum and minimum, respectively.

In the analyzer 17, from the Brillouin fluctuation periods obtained by Fourier-transforming the measured Brillouin gain fluctuations, the beat length and birefringence are calculated. In the case of FIG. 5, the Brillouin gain fluctuation periods $L_P$ are observed as 32 centimeters, and the beat length $L_B$ is calculated to be 64 centimeters ($L_B=2L_P$) and the birefringence B is calculated to be $2.4 \times 10^{-6}$ ($B=\lambda/L_B$).

Hereinafter, a polarization characteristics measuring method according to the present invention using the measuring apparatus of FIG. 4, and an applied technique thereof will be described with reference to FIG. 6 to FIG. 11.

Figure 6:
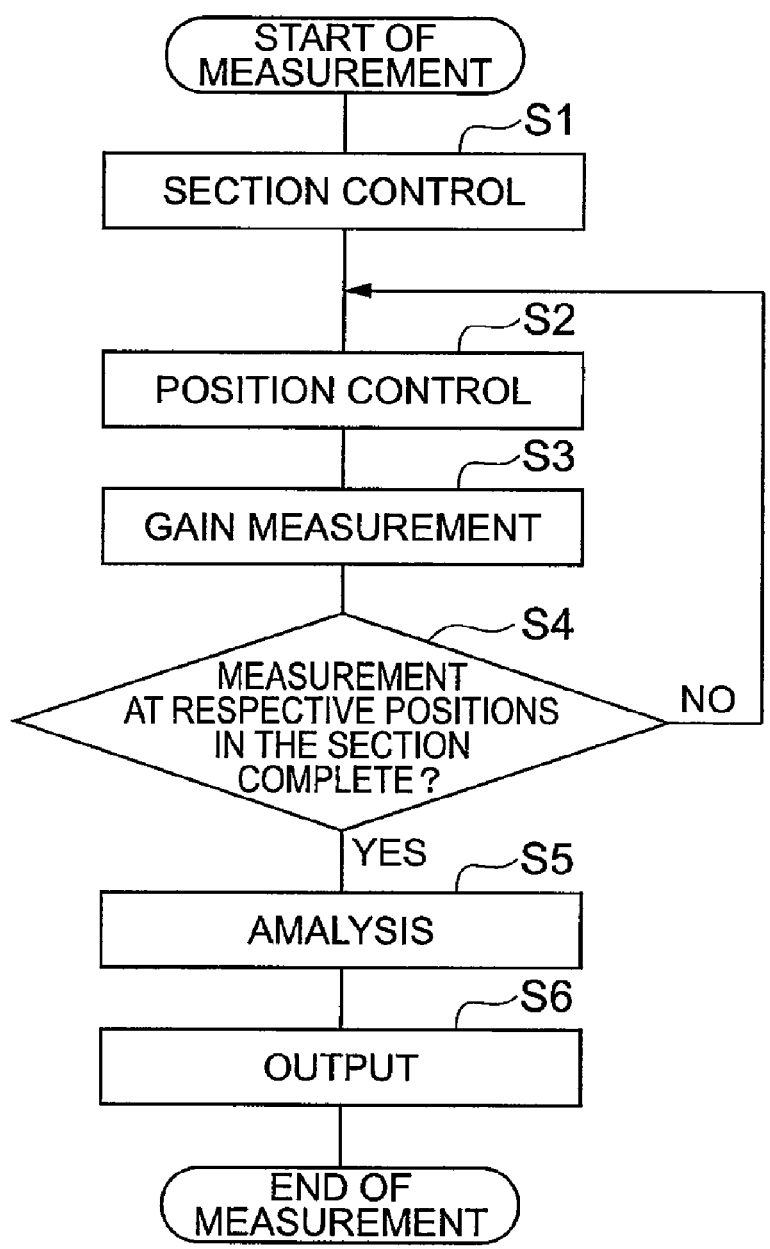
FIG. 6 is a flowchart for describing a first embodiment of the optical fiber polarization characteristics measuring method according to the present invention.

First Embodiment of Polarization Characteristics Measuring Method: FIG. 6

First, an example of the polarization characteristics measuring method in which according to BOCDA, a BGS is generated at a plurality of measurement positions set along the longitudinal direction of the optical fiber 7 as a measuring object, and based on Brillouin gain fluctuations at the respective measurement positions at which the BGS has been generated, polarization characteristics are calculated, will be described with reference to FIG. 6.

First, the entire length of the optical fiber 7 as a measuring object, or a predetermined section in the optical fiber 7 is set as a measurement section (section control step S1).

Next, in the waveform generator 1, by controlling the modulation frequency of the frequency modulation for the light source, the correlation peak position, that is, the measurement position is set within the measurement section (position control step S2). Then, at the correlation peak position, the Brillouin gain that the probe light obtains is measured (Brillouin gain measuring step S3).

Within the measurement section set at the section control step S1, when the Brillouin gain measurement is completed at the respective measurement positions set at the position control step S2 as described above, the analyzing step S5 in the analyzer 17 is performed. On the other hand, when the Brillouin gain measurement is not completed yet at the measurement positions set at the position control step S2, the correlation peak position is set so as to coincide with the next measurement position, and the Brillouin gain measurement is performed successively (measurement completion confirming step S4).

The Brillouin gain measurement results obtained at the respective measurement positions are analyzed by the analyzer 17 to calculate the Brillouin gain fluctuation periods and polarization characteristics (beat length, birefringence, etc.), and it is judged whether the polarization characteristics are proper at the respective measurement positions (measuring step S5). Then, Brillouin gain fluctuation periods, polarization characteristics, and the polarization characteristics properness judgment results at the respective measurement positions obtained at the analyzing step S5 are output, and the Brillouin gain measurement is ended (output step S6).

Figure 7:
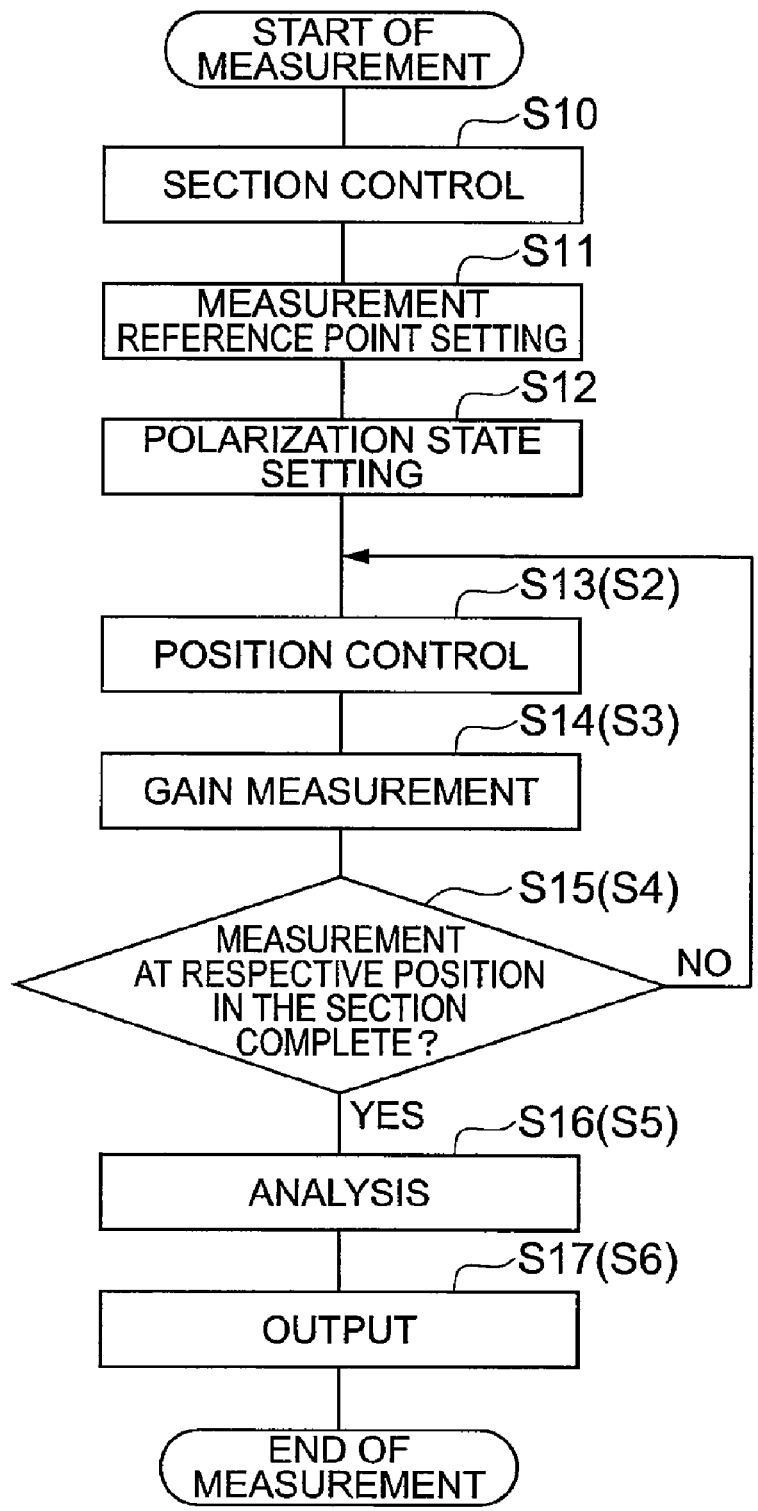
FIG. 7 is a flowchart for describing a second embodiment of the optical fiber polarization characteristics measuring method according to the present invention.

Second Embodiment of Polarization Characteristics Measuring Method: FIG. 7

Next, as a second embodiment of the polarization characteristics measuring method, a case where the incident polarization states of the probe light and the pumping light to be made incident on the optical fiber 7 are controlled so that a measurement reference point at which the Brillouin gain becomes maximum is present in the optical fiber 7 as a measuring object will be described with reference to FIG. 7.

First, the entire length of the optical fiber 7 as a measuring object or a predetermined section in the optical fiber 7 is set as a measurement section (section control step S10), and a predetermined point within the set measurement section is set as a measurement reference point (measurement position) (measurement reference point setting step S11). Then, by changing the incident polarization state of the pumping light or probe light by the polarization controller (polarization controller 8, 18 in FIG. 4) inserted at least in one incident end of the pumping light or probe light, the relative polarization state at the measurement reference point is properly controlled (polarization state setting step S12).

In the polarization state setting step S12, for example, the polarization state is controlled so that the Brillouin gain becomes maximum at the measurement reference point. Alternatively, the polarization state is controlled so that the amplitude of oscillation of the Brillouin gain becomes maximum near the measurement reference point.

In steps S13 to S17 successive to the above-described polarization state setting step S12, the same operations as in steps S2 to S6 of the first embodiment (FIG. 6) of the polarization characteristics measuring method are performed, so that overlapping descriptions are omitted.

Figure 8:
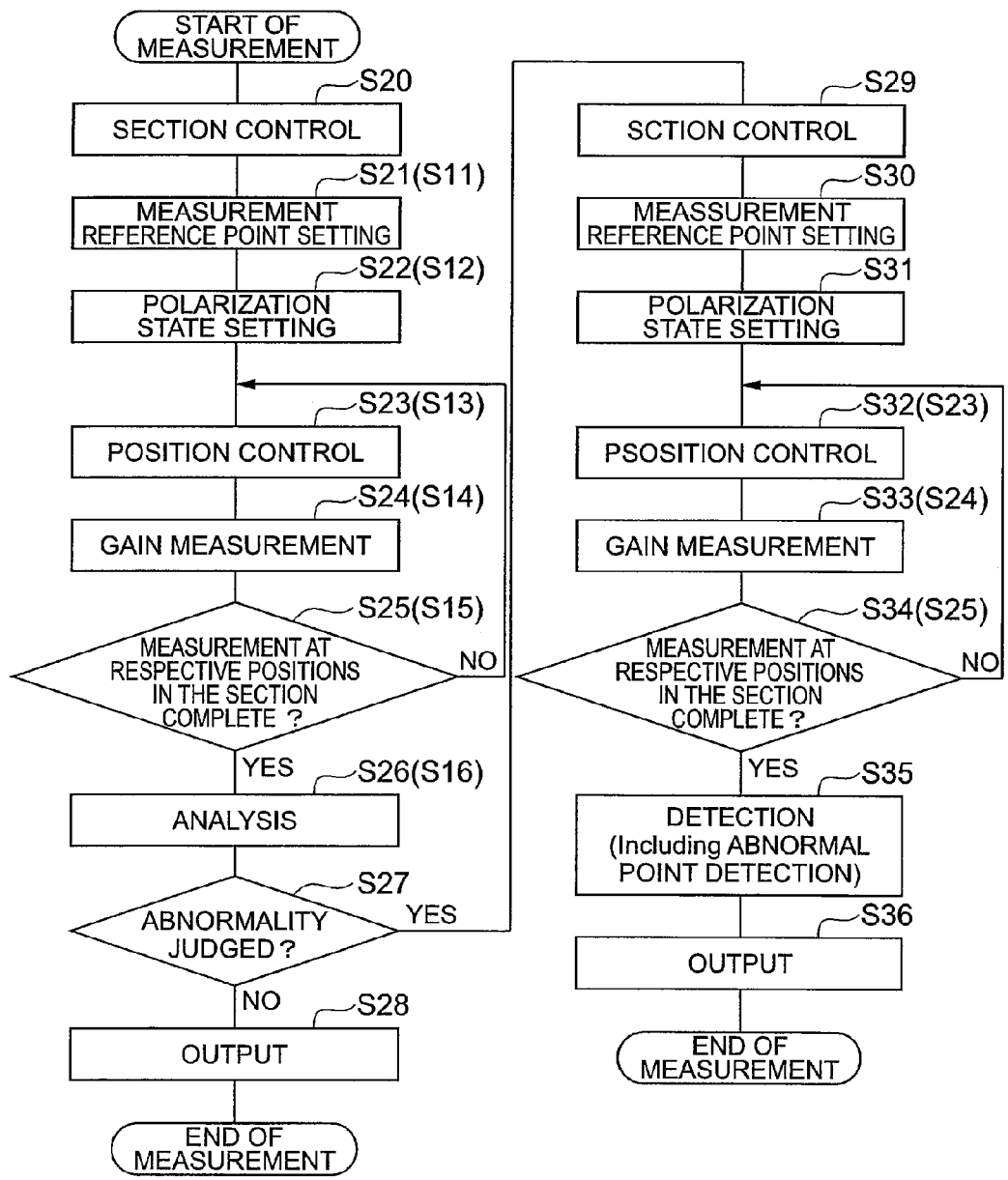
FIG. 8 is a flowchart for describing the optical fiber abnormal point identifying method according to the present invention (a third embodiment of the optical fiber polarization characteristics measuring method according to the present invention is applied)

(Abnormal Point Identifying Method: FIG. 8)

Next, an abnormal point identifying method for an optical fiber according to the present invention will be described with reference to FIG. 8. To the abnormal point identifying method, the third embodiment of the optical fiber polarization characteristics measuring method according to the present invention is applied. In other words, according to the polarization characteristics measuring method according to the third embodiment, Brillouin gain fluctuation periods are calculated based on Brillouin gain fluctuations at the plurality of measurement positions set along the longitudinal direction of the optical fiber 7 to be measured (including calculation based on the Brillouin gain fluctuations). In this third embodiment, when the obtained Brillouin gain fluctuation periods are out of a permissible range, the intervals of the measurement positions are narrowed and the Brillouin gain fluctuation periods are remeasured. Alternatively, when the measured Brillouin gain fluctuation periods are out of the permissible range, by controlling the incident polarization states of the probe light and the pumping light to be made incident on the optical fiber 7 so that a measurement position (measurement reference point) at which the Brillouin gain becomes maximum is present at a portion out of the permissible range, the Brillouin gain fluctuation periods are remeasured (including calculation based on the Brillouin gain fluctuations).

First, the section length of the measurement section and the sampling interval (interval between measurement positions) in the optical fiber 7 to be measured are properly set (section control step S20). For example, the section length is set to 100 meters and the sampling interval is set to 1 meter.

At steps S21 to S26 successive to the above-described section control step S20, the same operations as in steps S11 to S16 of the second embodiment (FIG. 7) are performed, so that overlapping descriptions are omitted.

At the abnormality judging step S27, it is judged whether the Brillouin gain fluctuation periods calculated at the analyzing step S26 are "constant or not" or "abnormal or not." In the abnormality judging step S27, when the Brillouin gain fluctuation periods are judged as "not constant" or "abnormal," the section control step S29 is executed.

The judgment at the abnormality judging step S27 is performed as follows. For example, when the measuring object is a standard single mode fiber, the beat length is about 10 meters, so that the Brillouin gain fluctuation periods are about 5 meters. When these Brillouin gain fluctuation periods deviate by a predetermined value or more (first permissible range: for example, 2.5 meters) from 5 meters, the periods are judged as "not constant or abnormal." On the other hand, when the Brillouin gain fluctuation periods are judged as "constant" or "not abnormal" (not deviate by the first permissible range or more), at the output step S28, polarization characteristics analyzed at the analyzing step S26 are output and the measurement is ended.

When "not constant or abnormal" is judged at the abnormality judging step S27, at the section control step S29, the section length of the measurement section and the sampling interval are narrowed and reset, respectively. For example, the section length is reset to about 10 meters and the sampling interval is reset to 10 centimeters.

At the measurement reference point setting step S30, in a measurement section in which an abnormality is found, a measurement reference point is reset. At the subsequent polarization state setting step S31, by controlling the polarization state of at least one of the pumping light and the probe light, the polarization state is controlled so that the Brillouin gain becomes maximum at the measurement reference point reset at the measurement reference point setting step S30. Alternatively, the polarization state is controlled so that the amplitude of the Brillouin gain becomes maximum near the measurement reference point. However, this polarization state setting step S31 may not always be performed.

At steps S32 to S34, the same operations as in the above-described position control step S23 to the measurement completion conforming step S25 are performed, so that overlapping descriptions are omitted.

At the detecting step S35, gain oscillation periods are calculated from the Brillouin gain measured values measured at the gain measurement step S33, and an abnormal point is detected. Then, at the output step S36, based on the detection results of the detecting step S35, a detailed position of the abnormal point and polarization characteristic values at the abnormal point are output, and accordingly, remeasurement is ended.

Figure 9:
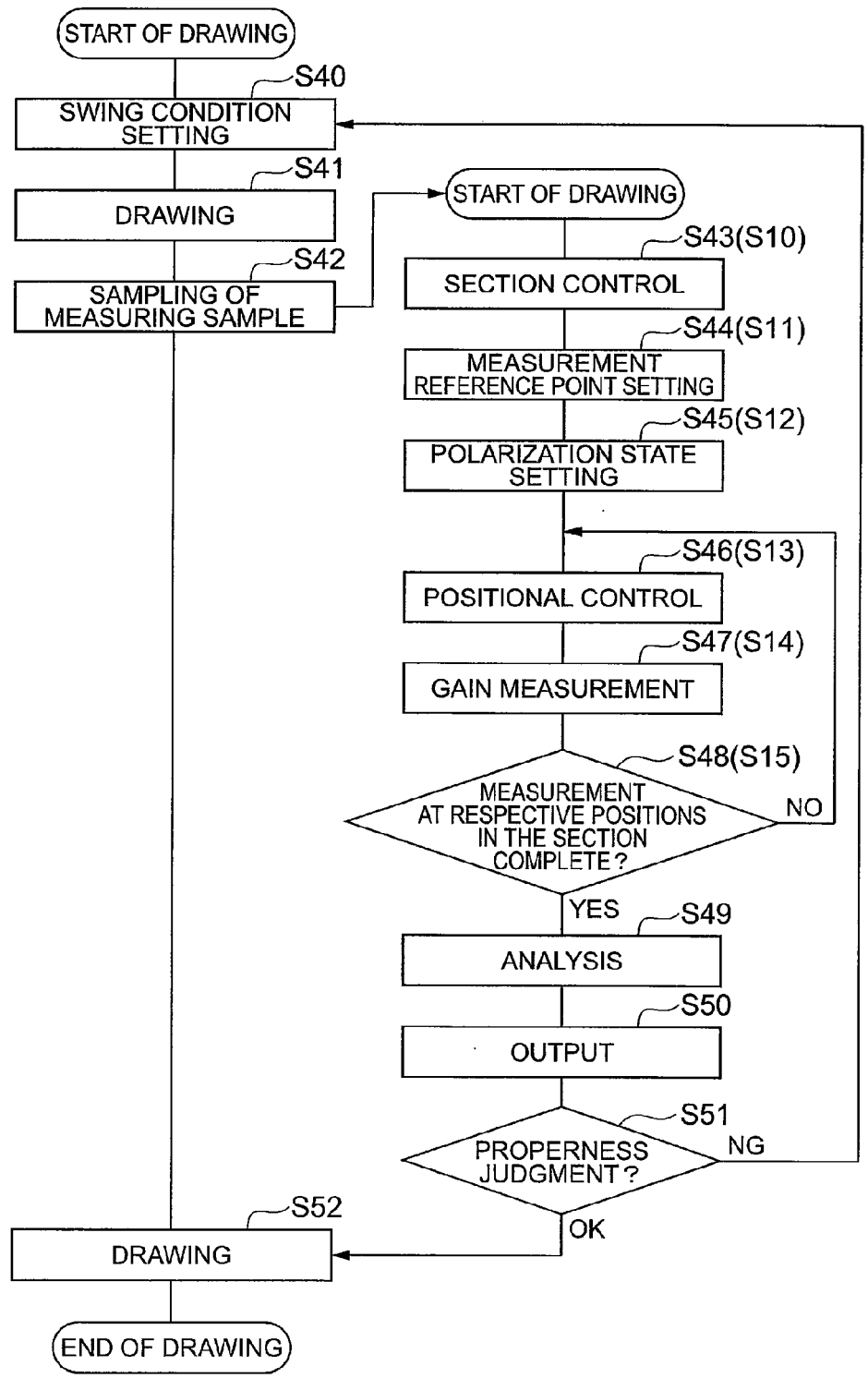
FIG. 9 is a flowchart for describing an optical fiber drawing method according to the present invention.
Figure 10:
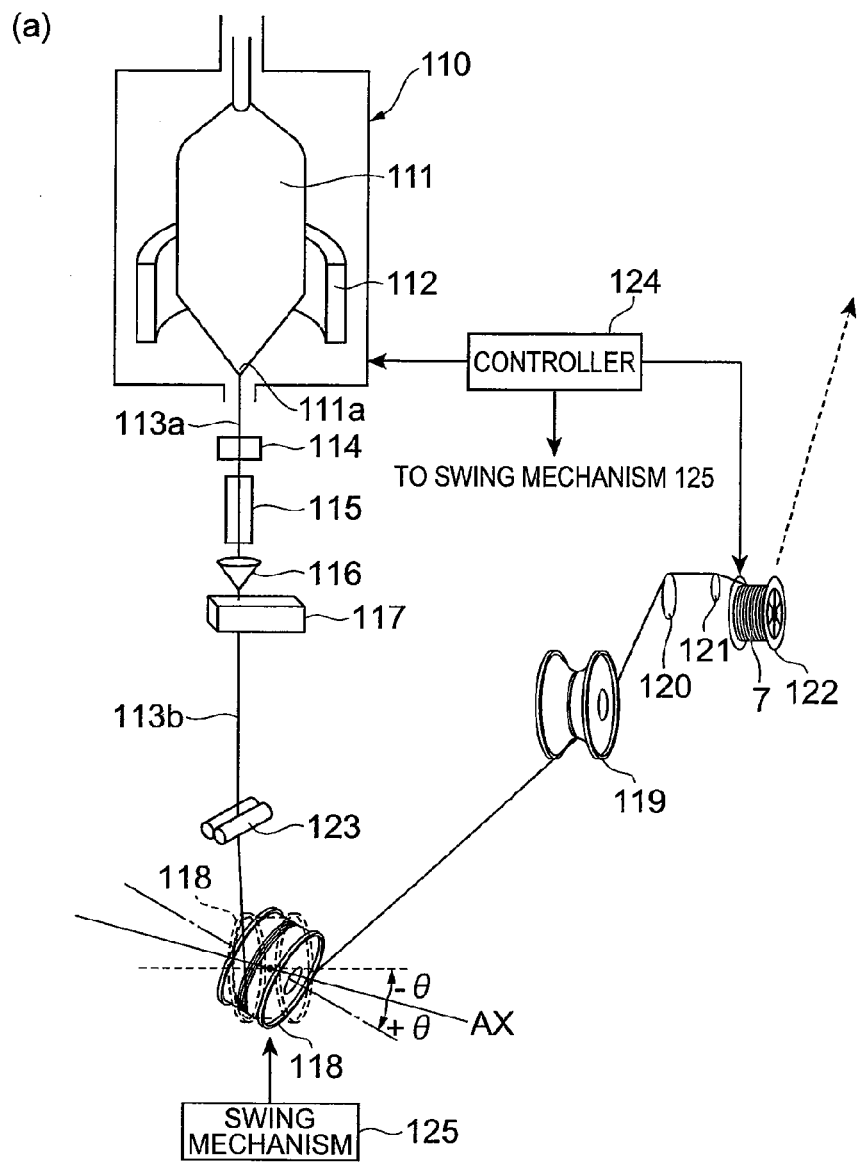
FIG. 10 is a perspective view showing a structure of a swing drawing device and a construction of an optical fiber sample.
Figure 10:
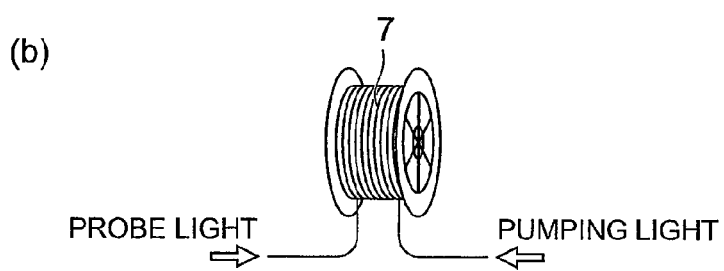

(Swing Drawing: FIG. 9, FIG. 10)

Next, as one of usages of the optical fiber polarization characteristics measuring method according to the present invention, an optical fiber manufacturing technique using a swing drawing method (an optical fiber drawing method according to the present invention) will be described with reference to FIG. 9 and FIG. 10. In the drawing method, an optical fiber sample obtained according to the swing drawing method (the optical fiber 7 cut out from the optical fiber obtained according to the swing drawing method) is a measuring object, and according to the BOCDA, Brillouin gain fluctuation periods at the respective measurement positions along the longitudinal direction of this optical fiber sample are measured. Then, based on the correlation between the swing periods and the Brillouin fluctuation periods of the optical fiber sample, the swing periods of the swing drawing method are properly adjusted, and under the thus adjusted conditions, an optical fiber is drawn while being swung. To the optical fiber drawing method according to the present invention, any of the polarization characteristics measuring methods (FIG. 6 to FIG. 8) according to the described-above first to third embodiments may be applied.

First, an optical fiber sample with a predetermined length is manufactured according to a known swing drawing method. This optical fiber sample is the optical fiber 7 as a measuring object, and is a part cut out from the optical fiber obtained by means of swing drawing. When starting drawing, swing conditions are set (S40). Herein, the swing conditions are the spinning amount and the spinning period, etc., of the optical fiber to be drawn.

The swing drawing is performed by the swing drawing apparatus shown in the area (a) of FIG. 10. In other words, the swing drawing apparatus shown in the area (a) of FIG. 10 includes a drawing furnace 110 having a heater 112 installed inside, an outer diameter measuring device 114, a cooling device 115, a resin coating device 116, a curing device 117, a guide 123, a swing roller 119 and a fixed roller 118 for spinning the drawn optical fiber, a winding device 122 which winds the optical fiber through the guide rollers 120 and 121, a swing mechanism 125 for controlling the swing roller 118, and a controller 124.

In the swing drawing apparatus, first, an optical fiber preform 111 is set in the drawing furnace 110 and the lower end of the optical fiber preform 111 is heated by the heater 112 inside the drawing furnace 110. By drawing the lower end of the optical fiber preform 111 (preform molten portion 111a) which is softened due to heating, a bare fiber 113 is obtained. The bare fiber 113a is spun by a swing roller 118 described later. The outer diameter of the bare fiber 113a is measured by the outer diameter measuring device 114, and the controller 124 to which the measurement result is fed back performs control so that a predetermined outer diameter is obtained. The bare fiber 113a is further cooled by the cooling device 115, and then its surface is coated with a resin by the resin coating device 116. The coated resin is cured by the curing device 117, whereby a resin coating in close contact with the surface of the bare fiber 113a is formed.

The optical fiber 113b on which the resin coating is formed is rotated by the swing roller 118 via the guide 123, and the preform molten portion 111a is spun. The bare fiber 113a thus spun is drawn. The resin coating itself is not spun. On the other hand, the optical fiber 113b is prevented from rolling by the fixed roller 119. Therefore, the optical fiber 113b rolls between the swing roller 118 and the fixed roller 119. The optical fiber 113b is further wound by the winding device 122 through the guide rollers 120 and 121.

The swing mechanism 125 operates so as to incline periodically the rotation axis of the swing roller 118 from −θ to +θ periodically with respect to a reference axis AX in response to an instruction signal from the controller 124.

By using the above-described swing drawing apparatus, drawing is performed under the set swing conditions (S41), and a part of the obtained optical fiber, for example, the optical fiber 7 of about 50 meters is sampled as an optical fiber sample (optical fiber 7 as a measuring object) as shown in the area (b) of FIG. 10 (S42).

By using this optical fiber sample, for example, the same steps (S43 to S48) as steps S10 to S15 of the polarization characteristics measuring method (FIG. 7) of the second embodiment are successively executed to measure the Brillouin gain. The analyzer 17 analyzes the actual swing pattern of the optical fiber from the oscillation pattern of the Brillouin gain (S49). When the analysis result is outputted (S50), based on the output result, it is judged whether the swing conditions are proper (S51).

In the properness judgment in the analyzer 17, when the swing conditions are judged as proper, the swing drawing is continued under these swing conditions (S52). On the contrary, when the swing conditions are judged as improper, the process returns to the swing condition setting step S40 and swing conditions are reset. Then, the drawing step S41 and subsequent steps are successively executed again.

Figure 11:
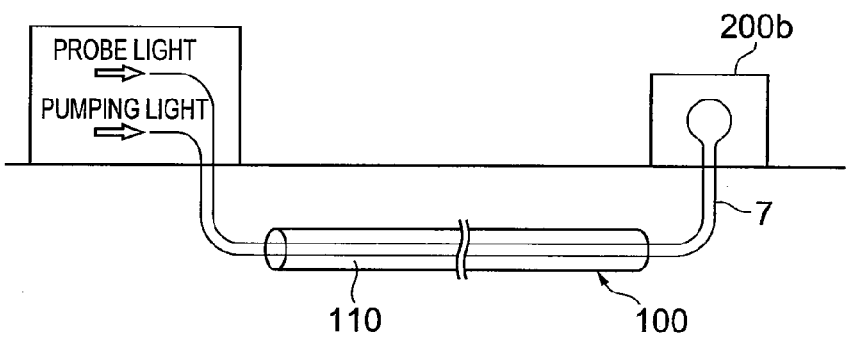
FIGS. 11(a), 11(b) and 11(c) are flowcharts for describing an optical fiber transmission line establishing method according to the present invention.
Figure 11:
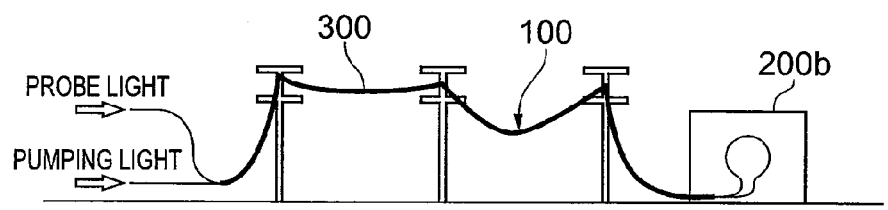
Figure 11:
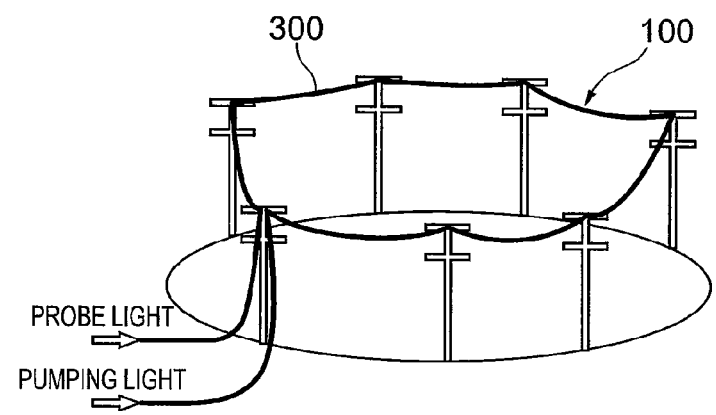

(Optical Fiber Transmission Line Establishing Method: FIG. 11)

Next, an optical fiber transmission line establishing method according to the present invention will be described with reference to FIG. 11. The optical fiber transmission line establishing method is an example of a usage of the polarization characteristics measuring method to which the abnormal point identifying method for an optical fiber shown in FIG. 8 is applied.

In the optical fiber transmission line establishing method, an optical fiber transmission line is established by replacing a part of an optical fiber positioned at an abnormal point identified according to the abnormal point identifying method for an optical fiber shown in FIG. 8 by another optical fiber.

In detail, in the optical fiber transmission line establishing method, for example, as shown in the area (a) of FIG. 11, a laid optical fiber is an optical fiber to be measured, and the Brillouin gain fluctuation periods are measured according to the BOCDA at the respective measurement sections along the longitudinal direction of the optical fiber 7 as a measuring object. The measured Brillouin gain fluctuation periods and a first permissible range set in advance (for example, 2.5 meters or more) are compared, and when the measured Brillouin gain fluctuation periods exceed the first permissible range, the corresponding measurement section is judged as an abnormal section.

Then, the intervals of the measurement positions in the abnormal section are narrowed, and the Brillouin gain fluctuation periods are remeasured. The Brillouin gain fluctuation periods obtained again through this remeasurement and a second permissible range set in advance (for example, 1.5 meters or more) are compared, and when the remeasured Brillouin gain fluctuation periods exceed this second permissible range, the corresponding remeasurement section is identified as an abnormal point 100.

In the optical fiber transmission line establishing method according to the present invention, after the optical fiber in the section identified as the abnormal point 100 as described above is removed, a new optical fiber is allocated to the removed section. Further, by setting the optical fiber transmission line including the new optical fiber replaced and allocated to the optical fiber identified as the abnormal section as a measuring object, Brillouin gain measurement for judging the presence of an abnormal point is performed again according to the above-described abnormal point identifying method.

The area (a) of FIG. 11 is a view for describing identification of an abnormal point of a ground-buried cable 110 as a laid optical fiber, and the optical fiber 7 is installed in a loop shape in a pipe line buried between a station 200a (may be a joint box or a closure) and a station 200b. Both ends of this optical fiber 7 are positioned at the station 200a, and from this station 200a, probe light and pumping light are made incident opposite from both ends of the optical fiber 7 to identify the abnormal point 100. The area (b) of FIG. 11 is a view for describing identification of an abnormal point of an aerial cable 300 as a laid optical fiber, and the optical fiber 7 is installed in a loop shape inside the aerial cable 300 connected to the station 200c. By making probe light and pumping light incident opposite from both ends of the optical fiber 7 thus installed, an abnormal point of the aerial cable is identified. The area (c) of FIG. 11 is also a view for describing identification of an abnormal point of an aerial cable as shown in the area (b), however, the aerial cable 300 is different from that shown in the area (b) in that the aerial cable 300 is installed in a ring shape. In each case, abnormal points of the measuring objects can be identified by performing polarization characteristics measurement by using the BOCDA in which pumping light and probe light are propagated opposite inside the optical fiber 7.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

A measuring method according to the present invention is widely applicable to various technical fields which can use optical sensing techniques such as optical fiber manufacturing techniques and transmission line maintenance and management, etc., as well as quality evaluation of optical fiber products themselves.

The invention claimed is:

1. A polarization mode dispersion (PMD) characteristic measuring method of measuring PMD characteristic distributions along a longitudinal direction of an optical fiber as an object to be measured by using Brillouin Optical Correlation Domain Analysis (BOCDA), the method comprising steps of:
    making probe light incident from one end of the optical fiber and making pumping light incident from the other end of the optical fiber;
    measuring a Brillouin gain spectrum at respective measurement positions along the longitudinal direction of the optical fiber as a gain to be given to the probe light due to Brillouin scattering generated by propagation of the pumping light inside the optical fiber; and
    calculating PMD characteristic distributions along the longitudinal direction of the optical fiber based on Brillouin gain fluctuation periods along the longitudinal direction of the optical fiber.

2. The PMD characteristic distribution measuring method according to claim 1, wherein an incident polarization state of at least one of the probe light and the pumping light to be made incident on the optical fiber is controlled so that a measurement reference point at which the Brillouin gain becomes maximum is present in the optical fiber.

3. The PMD characteristic distribution measuring method according to claim 1, wherein the calculating step includes calculating Brillouin gain fluctuation periods by Fourier-transforming the Brillouin gain fluctuations.

4. The PMD characteristic distribution measuring method according to claim 1, wherein Brillouin gain fluctuation periods obtained from Brillouin gain fluctuations at a plurality of respective measurement positions set at predetermined intervals along the longitudinal direction of the optical fiber are measured, and wherein, when the Brillouin gain fluctuation periods measured at the plurality of set measurement positions are out of a permissible range, the intervals of the plurality of measurement positions are narrowed and the Brillouin gain fluctuation periods are remeasured.

5. The PMD characteristic distribution measuring method according to claim 1, wherein Brillouin gain fluctuation periods are measured based on Brillouin gain fluctuations at a plurality of respective measuring positions set at predetermined intervals along the longitudinal direction of the optical fiber, and wherein, when the Brillouin gain fluctuation periods measured at the plurality of set measurement positions are out of a permissible range, incident polarization states of the probe light and the pumping light to be made incident on the optical fiber are adjusted so that a measurement reference point is present at a portion at which the Brillouin gain fluctuation out of the permissible range is obtained, and Brillouin gain fluctuation periods are remeasured.

6. An optical fiber drawing method, comprising:

measuring PMD characteristic distributions of an optical fiber under drawing by using the PMD characteristic distribution measuring method according to claim 1; and adjusting PMD characteristic distributions of the optical fiber under drawing by fluctuation swing periods to be added to the optical fiber under drawing on the basis of a current PMD of the obtained by the measuring method according to claim 1.

7. An abnormal point identifying method for an optical fiber, comprising the steps of:

measuring Brillouin gain fluctuation periods in respective measurement sections which are along the longitudinal direction of a laid optical fiber as a measuring object and include a plurality of measurement positions set at predetermined intervals by using the PMD characteristic distribution measuring method according to claim 1;

judging a measurement section in which Brillouin gain fluctuation periods exceeding a first permissible range set in advance are measured as an abnormal section by comparing the Brillouin gain fluctuation periods measured in the respective measurement sections and the first permissible range;

remeasuring the Brillouin gain fluctuation periods in a remeasurement section after the measurement section judged as the abnormal section is set as the remeasurement section and a plurality of measurement positions intervals of which are narrowed are reset; and identifying the remeasurement section in which Brillouin gain fluctuation periods exceeding a second permissible range set in advance are measured as an abnormal point by comparing the remeasured Brillouin gain fluctuation periods and the second permissible range.

8. An optical fiber transmission line establishing method, comprising:

removing a part of the optical fiber corresponding to a section identified as an abnormal point according to the identifying method according to claim 7;

laying another optical fiber in a regulated section which is the removed part of the optical fiber; and identifying an abnormal point again according to the identifying method according to claim 7 in an entire optical fiber transmission line as a measuring object including another optical fiber newly laid.

* * * * *